(12) United States Patent
Harada et al.

(10) Patent No.: US 11,736,186 B2
(45) Date of Patent: Aug. 22, 2023

(54) OPTICAL COMMUNICATION SYSTEM AND MASTER STATION

(71) Applicant: NIPPON TELEGRAPH AND TELEPHONE CORPORATION, Tokyo (JP)

(72) Inventors: Rintaro Harada, Musashino (JP); Hirotaka Ujikawa, Musashino (JP); Shin Kaneko, Musashino (JP); Jun Terada, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/916,755

(22) PCT Filed: Apr. 9, 2020

(86) PCT No.: PCT/JP2020/016021
§ 371 (c)(1),
(2) Date: Oct. 3, 2022

(87) PCT Pub. No.: WO2021/205617
PCT Pub. Date: Oct. 14, 2021

(65) Prior Publication Data
US 2023/0155674 A1 May 18, 2023

(51) Int. Cl.
*H04B 10/035* (2013.01)
*H04B 10/278* (2013.01)
(Continued)

(52) U.S. Cl.
CPC ......... *H04B 10/035* (2013.01); *H04B 10/032* (2013.01); *H04B 10/278* (2013.01); *H04J 14/08* (2013.01)

(58) Field of Classification Search
None
See application file for complete search history.

(56) References Cited

U.S. PATENT DOCUMENTS

2002/0109876 A1* 8/2002 Eijk ............... H04Q 11/0066
398/58
2011/0268435 A1* 11/2011 Mizutani ............ H04Q 11/0067
398/5
(Continued)

OTHER PUBLICATIONS

Rintaro Harada et al., Cyclic Wavelength Allocation Scheme Reducing the Number of Wavelengths in Bus-Topology WDM Access Systems, 2020 IEICE General Conference, Mar. 17, 2020, p. 159.
(Continued)

*Primary Examiner* — Darren E Wolf
(74) *Attorney, Agent, or Firm* — Harness, Dickey & Pierce, P.L.C.

(57) ABSTRACT

The present invention enables shortening the time required for resuming communication in a protection method that uses a backup path in an optical communication system that includes a master station device and multiple slave station devices. The slave station devices are connected to a loop path in parallel. The communication paths between the master station device and the slave station devices include a normal path and a backup path. The master station device executes communication control processing with respect to the slave station devices based on the RTTs. A first slave station device is one of the slave station devices, and a second slave station device is a slave station device that cannot perform communication via the normal path. If a second slave station device is detected, the master station device calculates a second backup path RTT for the second slave station device based on the first normal path RTT and the first backup path RTT for the first slave station device and a second normal path RTT for the second slave station
(Continued)

device. The master station device then resumes communication control processing for the second slave station device based on the calculated second backup path RTT.

6 Claims, 9 Drawing Sheets

(51) Int. Cl.
*H04B 10/032* (2013.01)
*H04J 14/08* (2006.01)

(56) References Cited

U.S. PATENT DOCUMENTS

| 2013/0045010 A1* | 2/2013 | Mukai | H04J 3/0688 |
|---|---|---|---|
| | | | 398/52 |
| 2013/0266306 A1* | 10/2013 | Kozaki | H04B 10/272 |
| | | | 398/5 |
| 2017/0155576 A1* | 6/2017 | Addeo | H04L 12/437 |

OTHER PUBLICATIONS

Hirotaka Ujikawa et al., Protection Architecture for Reliable Bus-topology WDM Access Systems, 2020 IEICE General Conference, Mar. 17, 2020, p. 161.

\* cited by examiner

OPTICAL COMMUNICATION SYSTEM AND MASTER STATION

CROSS-REFERENCE TO RELATED APPLICATIONS

This application is a 371 U.S. National Phase of International Application No. PCT/JP2020/016021, filed on Apr. 9, 2020. The entire disclosure of the above application is incorporated herein by reference.

TECHNICAL FIELD

The present invention relates to an optical communication system and a master station device in the optical communication system.

BACKGROUND ART

A PON (Passive Optical Network) system is known as an optical communication system. In recent years, a TWDM-PON (Time and Wavelength Division Multiplexing—PON) system that uses WDM (Wavelength Division Multiplexing) technology has also been proposed.

NPL 1 discloses a bus-topology WDM Access System as an example of a TWDM-PON system. The network topology of an OLT (Optical Line Termination, or Optical Line Terminal) and ONUs (Optical Network Units) is a bus topology. Such a bus-topology WDM access system is applied to a MFH (Mobile Fronthaul) when deploying a mobile communication area linearly, for example.

NPL 2 discloses a protection method for improving reliability in a bus-topology WDM access system. In the case of a bus topology, if the trunk fiber becomes disconnected, communication may be cut off for many ONUs. In view of this, a loop-shaped communication path is formed by combining the main trunk fiber with a backup trunk fiber. In a normal situation where no disconnection has occurred, the backup path is cut off by an optical switch, and communication between the OLT and ONUs is performed only via the normal path. If a disconnection occurs in a portion of the normal path, the backup path is enabled in addition to the normal path. The OLT then uses the backup path to perform communication with disconnected ONUs that cannot perform communication via the normal path. This makes it possible to resume communication with all disconnected ONUs without waiting for repair of the optical fiber that constitutes the normal path.

CITATION LIST

Non Patent Literature

[NPL 1] Harada et al., "Cyclic Wavelength Allocation Scheme Reducing the Number of Wavelengths in Bus-Topology WDM Access Systems," IEICE (Institute of Electronics, Information and Communication Engineers) 2020, B-8-12, p. 159, March 2020.

[NPL 2] Ujikawa et al., "Protection Architecture for Reliable Bus-topology WDM Access Systems," IEICE (Institute of Electronics, Information and Communication Engineers) 2020, B-8-14, p. 161, March 2020.

SUMMARY OF THE INVENTION

Technical Problem

In an optical communication system that includes a master station device and multiple slave station devices, the master station device executes communication control processing for controlling communication with each of the slave station devices. Consider the case where this communication control processing is executed based on the "RTT" (Round Trip Time) between the master station device and each of the slave station devices. In the case of executing communication control processing based on RTT, the master station device needs to be aware of the RTT for all of the slave station devices.

For example, in a PON system, uplink communication from multiple slave station devices (ONU) to a master station device (OLT) is performed using TDMA (Time Division Multiple Access). In order to prevent uplink optical signals transmitted from the ONUS from colliding with each other, the OLT controls the transmission timing of the uplink optical signal from each ONU based on the corresponding RTT for that ONU. To achieve this, the OLT needs to be aware of the RTT for all of the communication partner ONUS in advance. Accordingly, when the OLT executes registration processing (discovery) for registering an ONU, the OLT measures the RTT for the ONU and holds the RTT together with other registration information.

Here, consider a protection method that uses a backup path as disclosed in NPL 2 described above. As described above, the OLT uses the backup path instead of the normal path to perform communication with disconnected ONUS that cannot perform communication via the normal path. In order to achieve this, it is necessary to execute the above-mentioned registration processing for all of the disconnected ONUs and measure the new RTT in the case of performing communication via the backup path. However, performing registration processing for all of the disconnected ONUs and measuring the new RTTs takes a long time. In other words, the amount of time required to resume communication increases.

One object of the present invention is to provide a technique for making it possible to shorten the time required for resuming communication in a protection method that uses a backup path in an optical communication system that includes a master station device and multiple slave station devices.

Solution to Problem

A first aspect of the present invention relates to an optical communication system.

The optical communication system includes:
  a plurality of slave station devices that are connected to a loop path in parallel; and
  a master station device that is connected to the loop path and configured to perform communication with each of the slave station devices.

Communication paths between the master station device and each of the slave station devices include:
  a normal path that extends along the loop path from the master station device to each of the slave station devices in a first direction, and
  a backup path that extends along the loop path from the master station device to each of the slave station devices in a second direction that is opposite to the first direction.

The master station device is configured to execute communication control processing for controlling communication with each of the slave station devices based on an RTT (Round Trip Time) between the master station device and the slave station device.

A normal path RTT is the RTT in a case of communication performed via the normal path.

A backup path RTT is the RTT in a case of communication performed via the backup path.

A first slave station device is one of the slave station devices.

A first normal path RTT is the normal path RTT between the master station device and the first slave station device.

A first backup path RTT is the backup path RTT between the master station device and the first slave station device.

A second slave station device is a slave station device that cannot perform communication via the normal path, among the plurality of slave station devices.

A second normal path RTT is the normal path RTT between the master station device and the second slave station device.

A second backup path RTT is the backup path RTT between the master station device and the second slave station device.

The master station device holds the normal path RTT for each of the slave station devices and the first backup path RTT.

If the second slave station device does not exist, the master station device executes the communication control processing with respect to the slave station devices based on the normal path RTTs.

If the second slave station device is detected, the master station device calculates the second backup path RTT based on the first normal path RTT, the first backup path RTT, and the second normal path RTT, and resumes the communication control processing with respect to the second slave station device based on the calculated second backup path RTT.

A second aspect of the present invention relates to a master station device that performs communication with each of a plurality of slave station devices in an optical communication system.

The slave station devices are connected to a loop path in parallel.

Communication paths between the master station device and each of the slave station devices include:
 a normal path that extends along the loop path from the master station device to each of the slave station devices in a first direction, and
 a backup path that extends along the loop path from the master station device to each of the slave station devices in a second direction that is opposite to the first direction.

The master station device is configured to execute communication control processing for controlling communication with each of the slave station devices based on an RTT (Round Trip Time) between the master station device and the slave station device.

A normal path RTT is the RTT in a case of communication performed via the normal path.

A backup path RTT is the RTT in a case of communication performed via the backup path.

A first slave station device is one of the slave station devices.

A first normal path RTT is the normal path RTT between the master station device and the first slave station device.

A first backup path RTT is the backup path RTT between the master station device and the first slave station device.

A second slave station device is a slave station device that cannot perform communication via the normal path, among the plurality of slave station devices.

A second normal path RTT is the normal path RTT between the master station device and the second slave station device.

A second backup path RTT is the backup path RTT between the master station device and the second slave station device.

The master station device holds the normal path RTT for each of the slave station devices and the first backup path RTT.

If the second slave station device does not exist, the master station device executes the communication control processing with respect to the slave station devices based on the normal path RTTs.

If the second slave station device is detected, the master station device calculates the second backup path RTT based on the first normal path RTT, the first backup path RTT, and the second normal path RTT, and resumes the communication control processing with respect to the second slave station device based on the calculated second backup path RTT.

Effects of the Invention

There are two types of communication paths between the master station device and each of the slave station devices, namely a normal path and a backup path. Accordingly, if there are second slave station devices that cannot perform communication via the normal path, communication can be resumed via the backup path. However, in that case, a second backup path RTT is needed for all of the second slave station devices. According to the present invention, the master station device holds a normal path RTT for each of the slave station devices and a first backup path RTT for the first slave station device. If a second slave station device is detected, the master station device calculates the second backup path RTT for each second slave station device based on the normal path RTT and the first backup path RTT for the first slave station device. The master station device then resumes communication control processing for each second slave station device based on the calculated second backup path RTT. It is not necessary to execute registration processing and directly measure the second backup path RTT for all of the second slave station devices. Accordingly, the time required to resume communication is shortened.

DESCRIPTION OF EMBODIMENTS

An embodiment of the present invention is described below with reference to the accompanying drawings.

1. Overview

1-1. Basic Configuration

Figure 1:
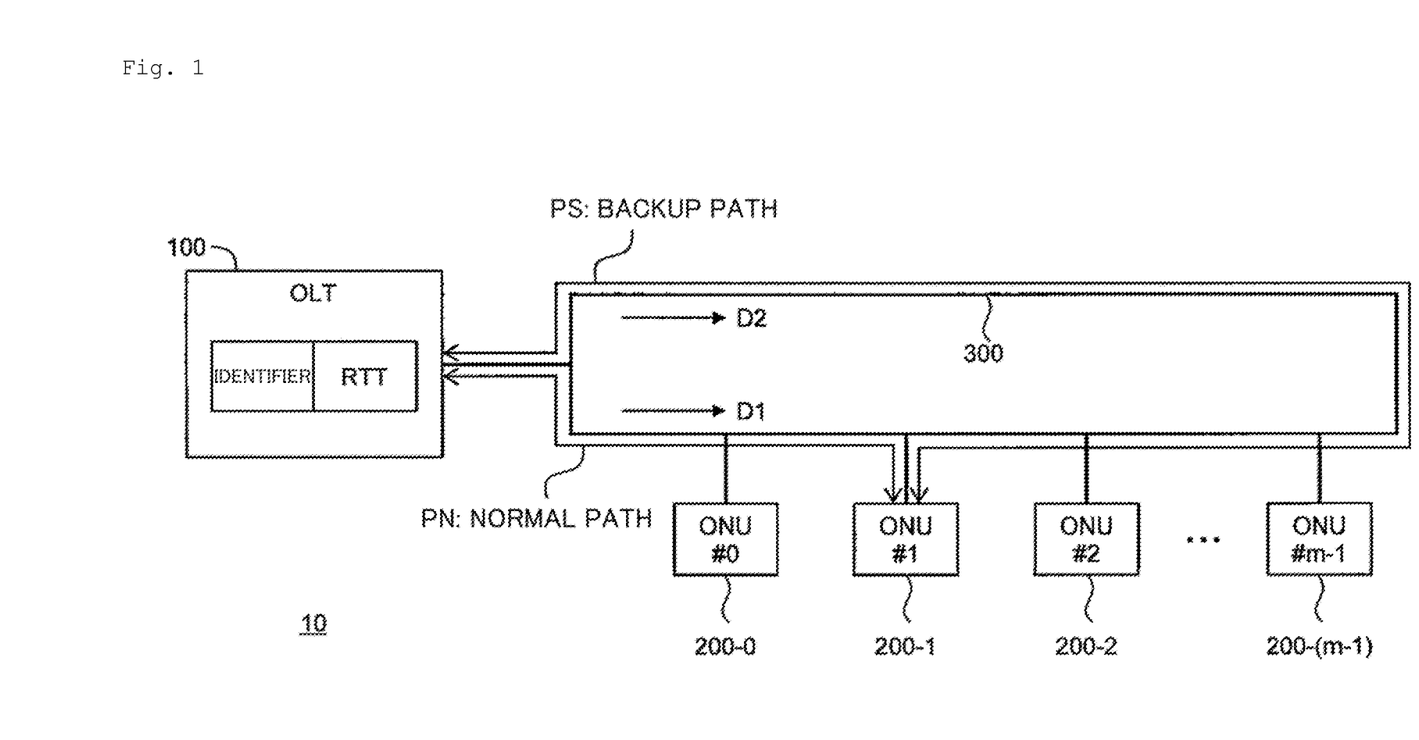
FIG. 1 is a conceptual diagram schematically showing a configuration of an optical communication system according to an embodiment of the present invention.

FIG. 1 schematically shows the configuration of an optical communication system 10 according to the present embodiment. The optical communication system 10 includes a master station device 100 and multiple slave station devices 200. In the example shown in FIG. 1, the optical communication system 10 includes m slave station devices 200-$i$ (i=0 to m-1). Here, m is an integer greater than or equal to 2. The master station device 100 is connected to the slave station devices 200 via an optical fiber and performs optical communication with each of the slave station devices 200.

In the following description, the optical communication system 10 is a PON (Passive Optical Network) system. The master station device 100 is hereinafter referred to as an "OLT (Optical Line Termination, or Optical Line Terminal) 100". The slave station devices 200 are hereinafter referred to as "ONUs (Optical Network Units) 200".

In the present embodiment, the network topology of the OLT 100 and the ONUs 200 is a bus topology. More specifically, as shown in FIG. 1, the optical communication system 10 includes a loop path 300 that is formed by a trunk fiber arranged in a loop. The OLT 100 is connected to the loop path 300. The ONUs 200 are connected to the loop path 300 in parallel.

Due to the inclusion of the loop path 300, two types of communication paths exist between the OLT 100 and each of the ONUs 200, namely a normal path PN and a backup path PS. For example, when considering the downlink direction from the OLT 100 to each of the ONUs 200, the normal path PN is a communication path that extends in a first direction D1 along the loop path 300. On the other hand, the backup path PS is a communication path that extends in a second direction D2, which is opposite to the first direction D1, along the loop path 300. FIG. 1 shows the normal path PN and the backup path PS for the ONU 200-1 as one example.

1-2. Normal Operation

Figure 2:
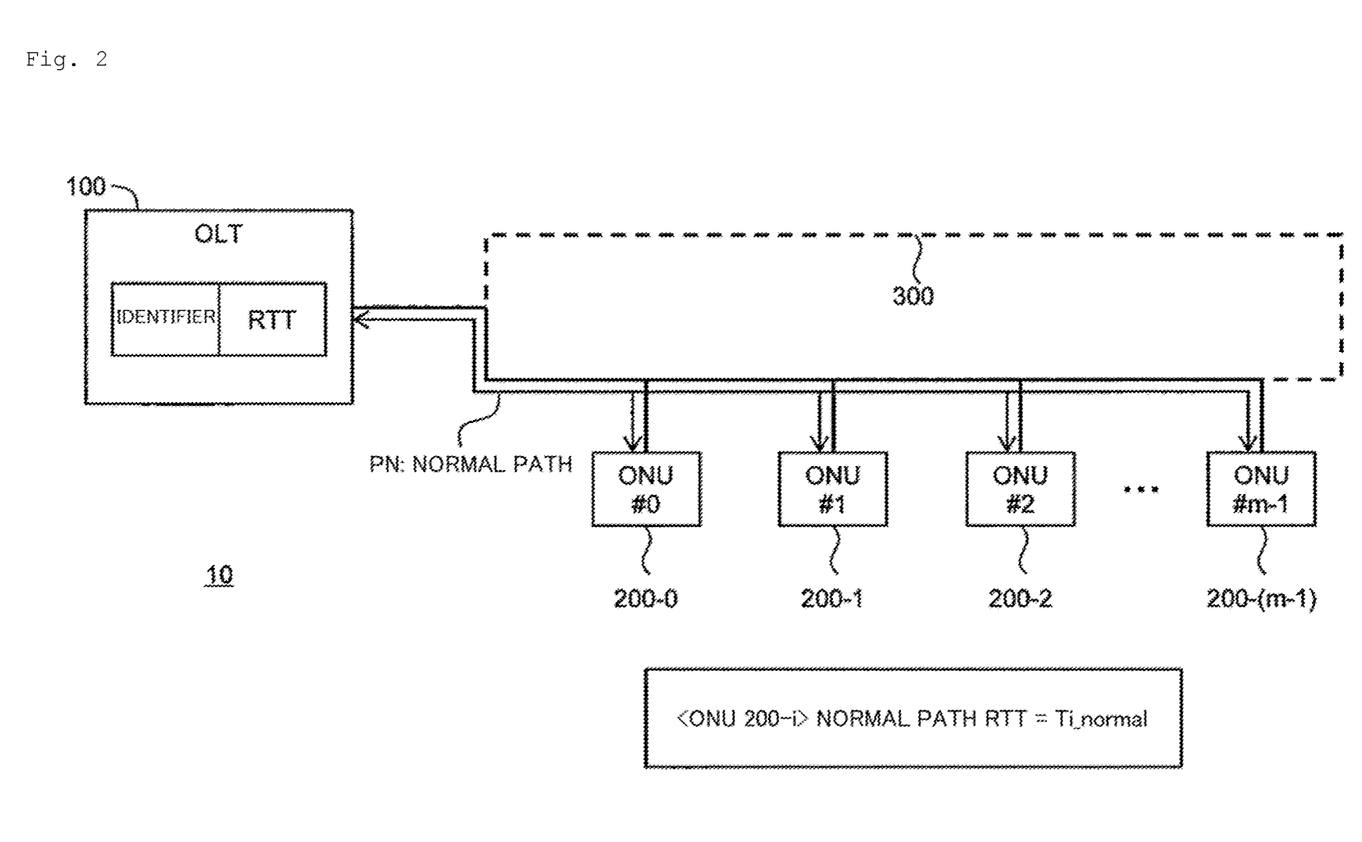
FIG. 2 is a conceptual diagram for describing normal operation of the optical communication system according to the embodiment of the present invention.

FIG. 2 is a conceptual diagram for describing normal operation of the optical communication system 10. In normal operation, the OLT 100 performs communication with each of the ONUs 200 via the normal path PN. To achieve this, the OLT 100 enables the normal path PN and disables the backup path PS.

First, the OLT 100 executes "registration processing (discovery)" for registering the ONUs 200 in order to establish communication links with the ONUs 200 that are connected to the PON network. In the registration processing, the OLT 100 detects the ONUs 200 that are connected to the PON network and assigns an identifier to each detected ONU 200. The OLT 100 notifies the ONUs 200 of the assigned identifiers, and the ONUs 200 each hold the notified identifier. Also, in the registration processing, the OLT 100 executes "ranging processing" for measuring the round-trip propagation time (hereinafter referred to as RTT (Round Trip Time)) between the OLT 100 and each of the ONUs 200. The OLT 100 holds an identifier and an RTT in association with each of the ONUs 200. After the registration processing is complete, the OLT 100 begins performing communication with the ONUs 200.

The OLT 100 executes "communication control processing" for controlling communication with each of the ONUs 200. Uplink communication from the ONUs 200 to the OLT 100 is performed using the same wavelength through TDMA (Time Division Multiple Access). In order to prevent uplink optical signals transmitted from the ONUs 200 from colliding with each other, the OLT 100 determines a transmission timing and a transmission amount for the uplink optical signals from each of the ONUs 200 based on the corresponding RTTs of the ONUs 200. The OLT 100 then generates transmission permission information that includes an identifier, a transmission timing, and a transmission amount for each of the ONUs 200.

The OLT 100 transmits the generated transmission permission information to each of the ONUs 200. The transmission permission information reaches the ONUs 200 through the normal path PN. The ONUs 200 reference the identifiers included in the transmission permission information and identify a corresponding portion of the transmission permission information. The ONUs 200 each then transmit an uplink optical signal in accordance with the transmission timing and the transmission amount indicated by the transmission permission information. The uplink optical signals transmitted from the ONUs 200 reach the OLT 100 through the normal path PN.

In this way, the OLT 100 holds an RTT for each of the ONUs 200 and executes communication control processing for controlling communication with the ONUs 200 based on the RTTs. For convenience, the RTT for the case of communication via the normal path PN is hereinafter referred to as "normal path RTT". During normal operation shown in FIG. 2, the OLT 100 holds a normal path RTT for each of the ONUs 200, and executes communication control processing for the ONUs 200 based on the normal path RTTs.

1-3. Protection

Next, a protection technique used in the optical communication system 10 according to the present embodiment will be described.

Figure 3:
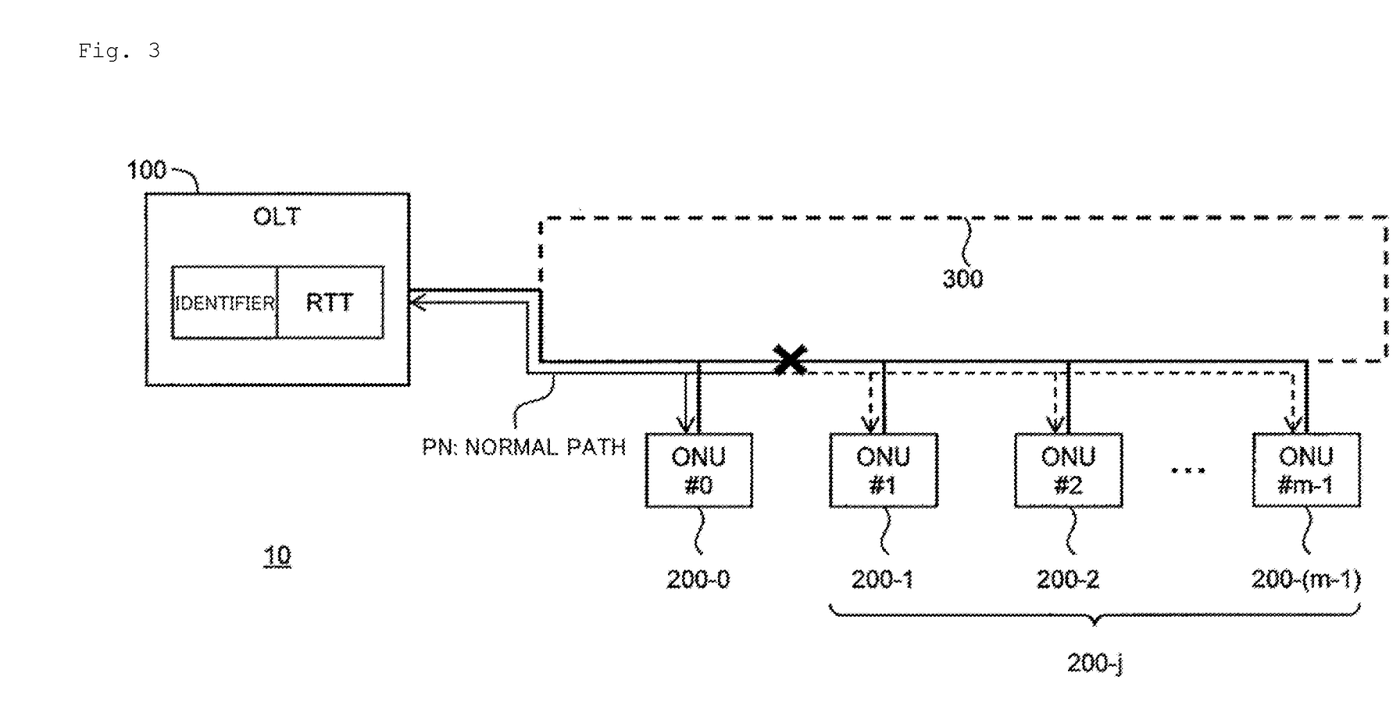
FIG. 3 is a conceptual diagram for describing a situation in which a fiber has become disconnected in the optical communication system according to the embodiment of the present invention.

FIG. 3 is a conceptual diagram for describing a situation in which a fiber has become disconnected in the normal path PN. In a bus topology, if a fiber becomes disconnected, communication with many ONUs 200 may be cut off. In the case of the example shown in FIG. 3, a fiber disconnection occurs in the section between the ON 200-0 and the ONU 200-1. As a result, communication with the ONUs 200-1 to 200-(m-1) is cut off. The ONUs 200 that cannot perform communication via the normal path PN are each hereinafter referred to as a "disconnected ONU 200-$j$". In the example shown in FIG. 3, the ONUs 200-1 to 200-(m-1) are respectively disconnected ONUs 200-$j$ (j=1 to m-1). According to the present embodiment, the above-described backup path PS is used in order to quickly resume (recover) communication with the disconnected ONUs 200-$j$.

Figure 4:
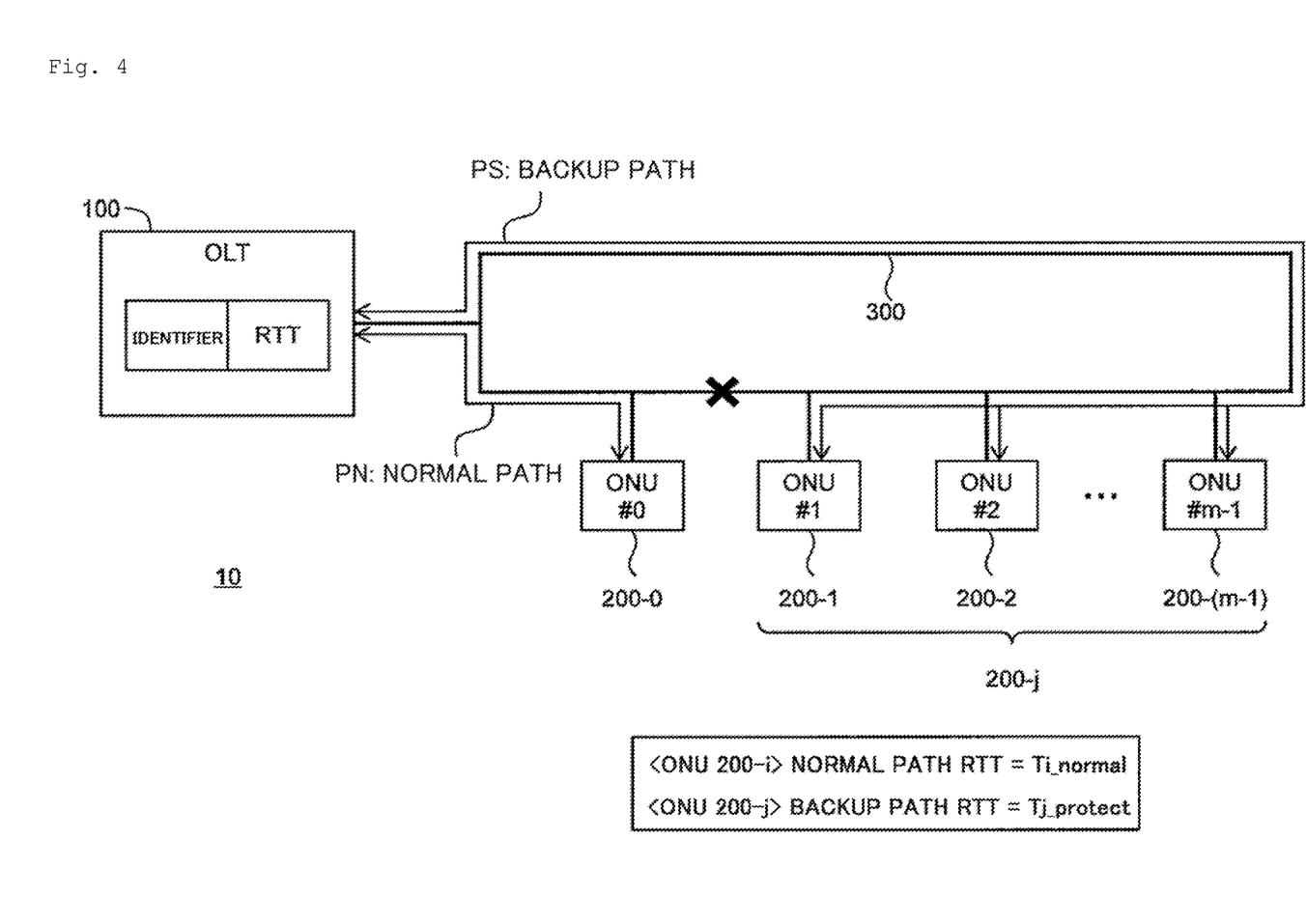
FIG. 4 is a conceptual diagram for describing operations performed using a normal path and a backup path in the optical communication system according to the embodiment of the present invention.

FIG. 4 is a conceptual diagram for describing operations performed using the normal path PN and the backup path PS in the optical communication system 10. The OLT 100 enables the backup path PS in addition to the normal path PN. In the case of the ONU 200-0 at a location before the fiber disconnection point, the OLT 100 performs communication with that ONU via the normal path PN. On the other hand, in the case of the disconnected ONUs 200-$j$ ($j$=1 to m-1), the OLT 100 performs communication with those ONUs via the backup path PS instead of the normal path PN. This makes it possible to resume communication with all of the disconnected ONUs 200-$j$ without waiting for repair of the optical fiber that constitutes the normal path PN.

However, the RTT for communication via the backup path PS is required in order to execute communication control processing for the disconnected ONUs 200-$j$. The RTT for communication via the backup path PS is hereinafter referred to as the "backup path RTT". Before the start of communication performed via the backup path PS, the OLT 100 needs to be aware of the backup path RTT for all of the disconnected ONUs 200-$j$. In other words, it is necessary to switch the RTT for all of the disconnected ONUs 200-$j$ from the normal path RTT to the backup path RTT.

However, it takes a long time to perform the above-mentioned registration processing for all of the disconnected ONUS 200-$j$ and measure the new backup path RTT. In other words, the amount of time required to resume communication increases. As the number of disconnected ONUS 200-$j$ increases, the number of times that registration processing needs to be performed to acquire the backup path RTT for all of the disconnected ONUS 200-$j$ increases, and the time required to resume communication increases. Also, uplink communication from the registered ONUS 200 needs to be temporarily suspended during the QuietWindow period set in the registration processing (ranging processing). Accordingly, the execution of registration processing for the disconnected ONUS 200-$j$ is accompanied by temporary suspension of uplink communication on the normal path PN and uplink delay.

In view of this, the present embodiment provides a technique capable of quickly acquiring the backup path RTT for all disconnected ONUS 200-$j$.

Figure 5:
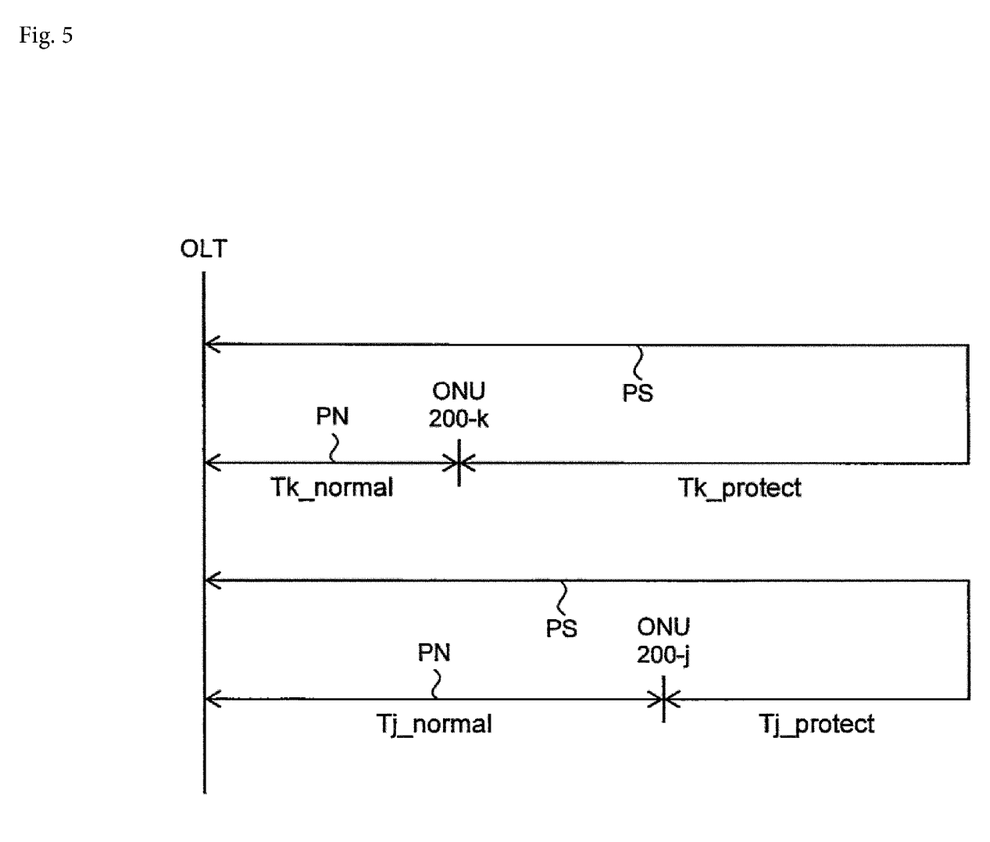
FIG. 5 is a conceptual diagram for describing a method of acquiring a backup path RTT for a disconnected ONU according to an embodiment of the present invention.

FIG. 5 is a conceptual diagram for describing a method of acquiring a backup path RTT for a disconnected ONU 200-$j$. The normal path RTT and the backup path RTT for each ONU 200-$i$ ($i$=0 to m-1) are represented by Ti_normal and Ti_protect, respectively.

A reference ONU 200-$k$ (first slave station device) is any one of the ONUS 200-$i$. The normal path RTT (Tk_normal) between the OLT 100 and the reference ONU 200-$k$ is hereinafter referred to as the "first normal path RTT". The backup path RTT (Tk_protect) between the OLT 100 and the reference ONU 200-$k$ is hereinafter referred to as the "first backup path RTT".

The disconnected ONU 200-$j$ (second slave station device) is an ONU 200 that cannot perform communication via the normal path PN as described above. The normal path RTT (Tj_normal) between the OLT 100 and the disconnected ONU 200-$j$ is hereinafter referred to as the "second normal path RTT". The backup path RTT (Tj_protect) between the OLT 100 and the disconnected ONU 200-$j$ is hereinafter referred to as the "second backup path RTT".

As shown in FIG. 5, the sum of the second normal path RTT (Tj_normal) and the second backup path RTT (Tj_protect) for the disconnected ONU 200-$j$ corresponds to the sum of the first normal path RTT (Tk_normal) and the first backup path RTT (Tk_protect) for the reference ONU 200-$k$. Accordingly, the OLT 100 can calculate the second backup path RTT (Tj_protect) based on the first normal path RTT (Tk_normal), the first backup path RTT (Tk_protect), and the second normal path RTT (Tj_normal).

In particular, if the connection distances between the loop path 300 and the ONUS 200-$i$ and are substantially the same, the second backup path RTT (Tj_protect) is expressed by Expression 1 shown below. Here, "the connection distances . . . are substantially the same" means that the connection distances are the same, or that the variation in connection distance is small enough to be ignored.

Tj_protect=Tk_normal+Tk_protect−Tj_normal   Expression 1:

The first normal path RTT (Tk_normal) and the second normal path RTT (Tj_normal) have been measured in the above-mentioned registration processing and are known. Even after a disconnected ONU 200-$j$ is detected, the OLT 100 holds the registration information (identifier, second normal path RTT) for that disconnected ONU 200-$j$ instead of deleting it. Thereafter, if the first backup path RTT (Tk_protect) for one reference ONU 200-$k$ is known, the second backup path RTT (Tj_protect) can be calculated for all disconnected ONUS 200-$j$.

There are various conceivable examples of methods for acquiring the first backup path RTT (Tk_protect). For example, before communication is started in normal operation, the OLT 100 selects one reference ONU 200-$k$ from among the ONUS 200-$i$, uses the backup path PS to preliminarily measure the first backup path RTT, and holds the measured value. As another example, after at least one disconnected ONU 200-$j$ is detected, the OLT 100 may select one of the detected disconnected ONUS 200-$j$ as the reference ONU 200-$k$, use the backup path PS to preliminarily measure the first backup path RTT, and hold the measured value. In either case, it is sufficient to simply measure the first backup path RTT for one reference ONU 200-$k$.

In this way, the OLT 100 calculates the second backup path RTT for each of the disconnected ONUs 200-$j$ based on the normal path RTT and the first backup path RTT for one reference ONU 200-$k$. It is not necessary to perform registration processing and directly measure the second backup path RTT for all of the disconnected ONUs 200-$j$. After the second backup path RTTs are calculated, the OLT 100 resumes communication control processing for the disconnected ONUs 200-$j$ based on the calculated second backup path RTTs. Note that given that the identifier of the disconnected ONU 200-$j$ does not change, the identifier does not need to be updated.

The OLT 100 may calculate the second backup path RTT for each disconnected ONU 200-$j$ using Expression 1 shown above. However, if the connection distances between the loop path 300 and each of the ONUs 200-$i$ are different, error may arise in the second backup path RTT calculated using Expression 1. In that case, the OLT 100 may set a slightly longer Grant period for the disconnected ONUs 200-$j$.

Also, after communication is resumed, the OLT 100 may periodically measure and update the second backup path RTT. Accordingly, the accuracy of the second backup path RTT is further improved.

1-4. Effects

As described above, according to the present embodiment, the plurality of ONUs 200 are connected to the loop path 300 in parallel. Accordingly, there are two types of communication paths between the OLT 100 and the ONUS 200, namely the normal path PN and the backup path PS. If there is a disconnected ONU 200-$j$ that cannot perform communication via the normal path PN, communication can be resumed using the backup path PS instead of the normal path PN. This makes it possible to resume communication with all of the disconnected ONUS 200-$j$ without waiting for repair of the optical fiber that constitutes the normal path PN.

In order to execute communication control processing for the disconnected ONU 200-$j$, it is necessary to use the second backup path RTT for the case of communication via the backup path PS. According to the present embodiment, the OLT 100 holds the normal path RTT for each of the ONUS 200 and the first backup path RTT for the reference ONU 200-$k$. If a disconnected ONU 200-$j$ is detected, the OLT 100 calculates the second backup path RTT for each disconnected ONU 200-$j$ based on the normal path RTT and the first backup path RTT for the reference ONU 200-$k$. The OLT 100 the resumes communication control processing for each disconnected ONU 200-$j$ based on the calculated second backup path RTT. It is not necessary to execute registration processing and directly measure the second backup path RTT for all of the disconnected ONUS 200-$j$. Accordingly, the time required to resume communication is further shortened. As the number of disconnected ONU 200-$j$ increases, the time saving effect becomes more remarkable.

Also, when registration processing is performed, it is necessary to temporarily suspend uplink communication on the normal path PN during the above-mentioned QuietWindow period. According to the present embodiment, it is not necessary to execute registration processing for all of the disconnected ONUS 200-$j$, thus suppressing suspension and uplink delay in uplink communication caused by registration processing. In other words, the RTT switching method according to the present embodiment does not interfere with communication on the normal path PN.

As a comparative example, a method of measuring the backup path RTT for all of the ONUS 200 in advance is also conceivable. However, in the case of this comparative example, each time a new ONU 200 is connected to the PON network, it is necessary to measure the backup path RTT for the new ONU 200. For this reason, it is necessary to suspend normal operation, disable the normal path PN, and enable the backup path PS. This is not realistic. According to the present embodiment, even if a new ONU 200 is connected to the PON network, it is not necessary to stop normal operation.

Hereinafter, the optical communication system 10 according to the present embodiment is described in more detail.

2. Example of Configuration of Optical Communication System

Figure 6:
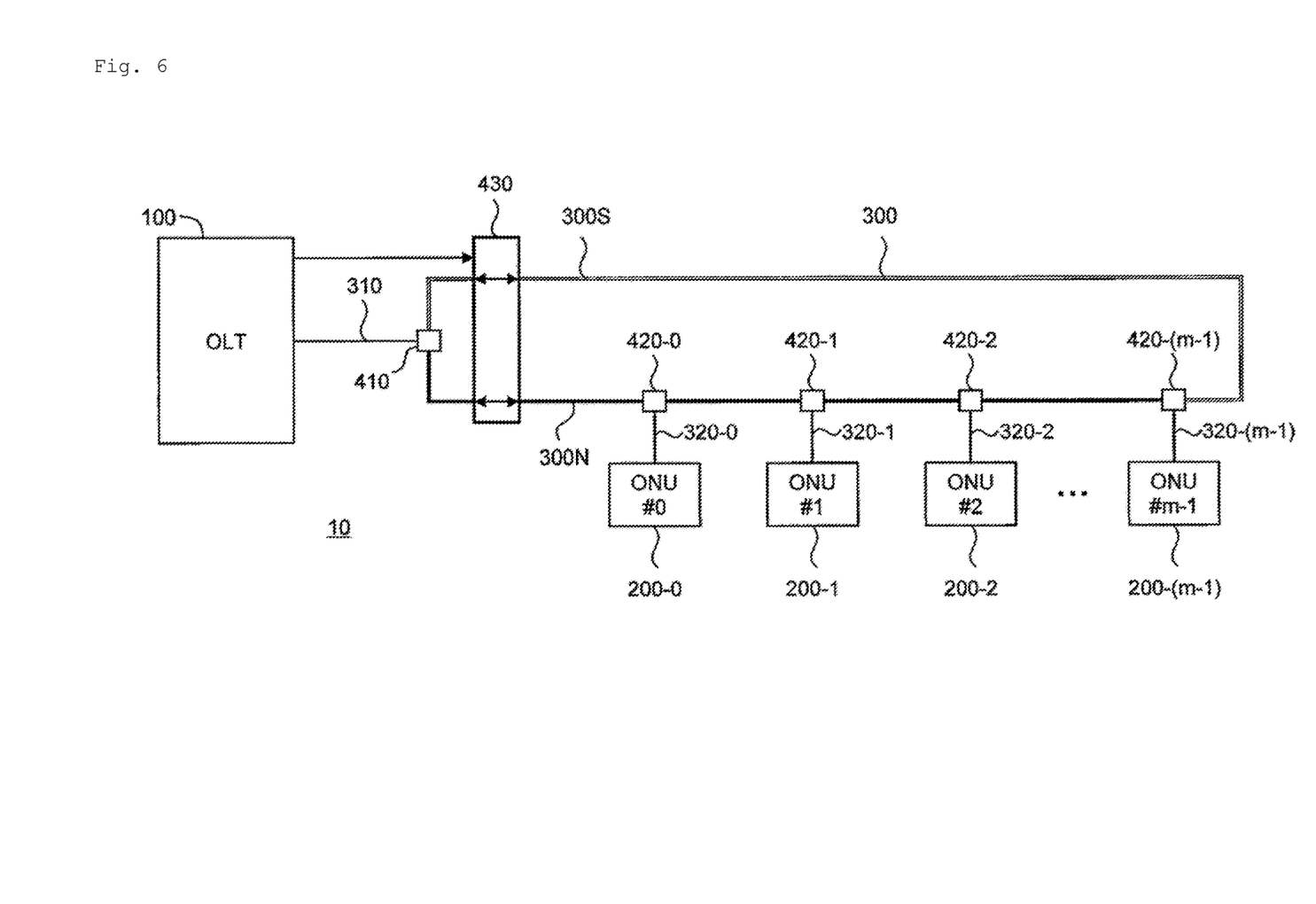
FIG. 6 is a conceptual diagram showing an example of the configuration of an optical communication system according to an embodiment of the present invention.

FIG. 6 is a conceptual diagram showing an example of the configuration of the optical communication system 10 according to the present embodiment. In this example, the optical communication system 10 is a TWDM-PON (Time and Wavelength Division Multiplexing—PON) system that employs wavelength division multiplexing (WDM) technology.

The optical communication system 10 includes the OLT 100, the ONUs 200-$i$ ($i$=0 to m-1), optical fibers (300N, 300S, 310, and 320-$i$), optical branching/coupling units 410 and 420-$i$, and an optical switch 430. The optical branching/coupling units 410 and 420-$i$ are optical splitters (power splitters), for example.

The OLT 100 is connected to the optical branching/coupling unit 410 via the trunk fiber 310. In the optical branching/coupling unit 410, the trunk fiber 310 is branched into a main trunk fiber 300N and a backup trunk fiber 300S. The loop path 300 is formed by connecting the main trunk fiber 300N and the backup trunk fiber 300S in a loop. The communication path constituted by the main trunk fiber 300N corresponds to the above-described normal path PN. On the other hand, the communication path constituted by the backup trunk fiber 300S corresponds to the above-described backup path PS.

The ONUs 200-$i$ are connected to the loop path 300 (main trunk fiber 300N) in parallel. More specifically, the optical branching/coupling units 420-$i$ are arranged in order on the main trunk fiber 300N. The ONUs 200-$i$ are respectively connected to the optical branching/coupling units 420-$i$ via branch fibers 320-$i$. Preferably, the branch fibers 320-$i$ have substantially the same length. Here, "substantially the same length" means that the lengths are the same, or that the variation in length is small enough to be ignored.

The optical branching/coupling unit 410 distributes downlink optical signals from the trunk fiber 310 to the main trunk fiber 300N and the backup trunk fiber 300S. The optical branching/coupling unit 410 also outputs uplink optical signals from the main trunk fiber 300N and the standby trunk fiber 300S to the trunk fiber 310.

The optical branching/coupling units 420-$i$ each distribute optical signals from the trunk fiber on one side to the trunk fiber and the branch fibers 320-$i$ on the other side. The optical branching/coupling units 420-$i$ each also distribute optical signals from the branch fibers 320-$i$ to the trunk fibers on both sides.

The optical switch 430 is provided on the main trunk fiber 300N and the standby trunk fiber 300S. The optical switch 430 enables/disables the normal path PN by allowing/blocking the passage of optical signals on the main trunk fiber 300N. Similarly, the optical switch 430 enables/disables the backup path PS by allowing/blocking the passage of optical signals on the backup trunk fiber 300S. The setting of this optical switch 430 is switched by the OLT 100.

Figure 7:
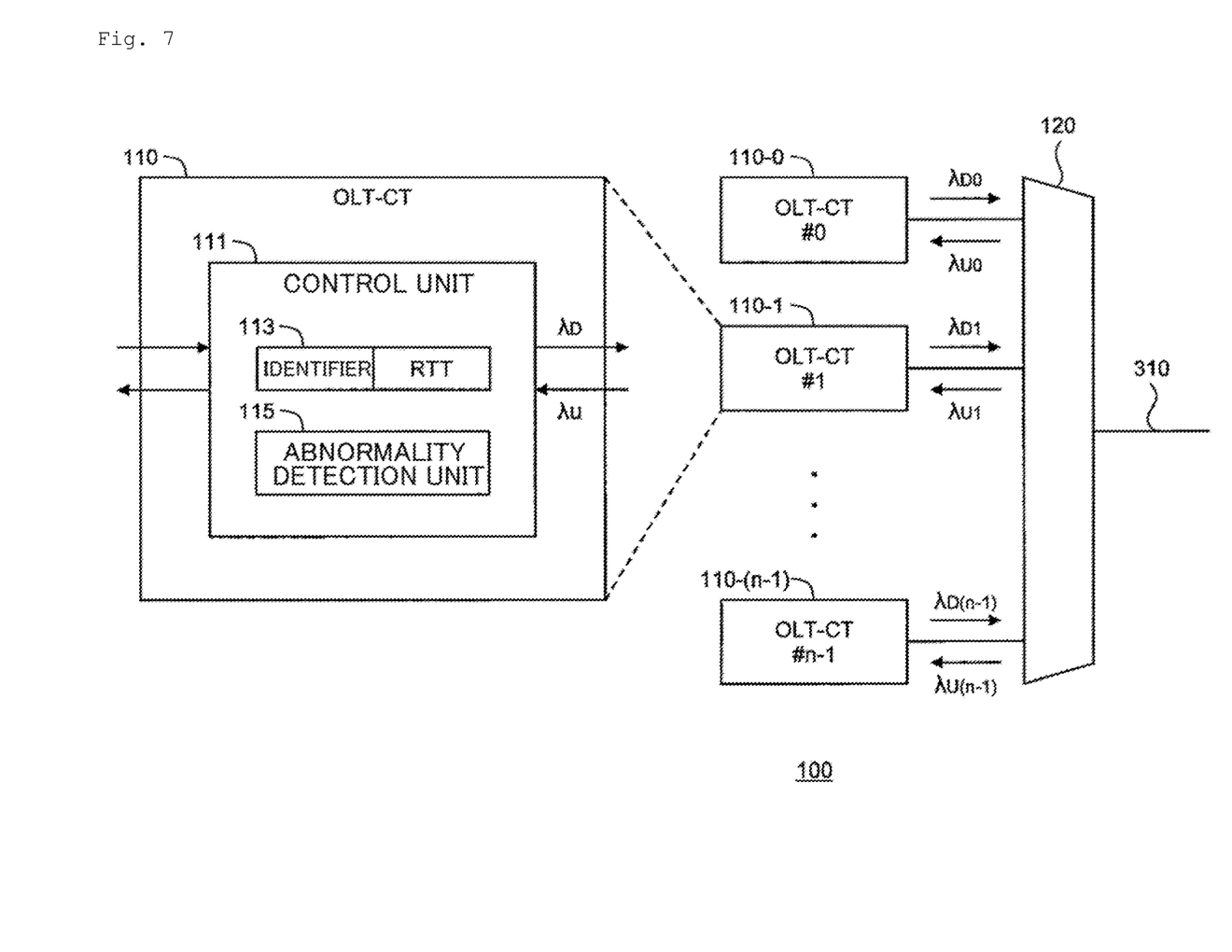
FIG. 7 is a conceptual diagram showing an example of the configuration of the master station device (OLT) in the optical communication system according to the embodiment of the present invention.

FIG. 7 is a conceptual diagram showing an example of the configuration of the OLT 100. The OLT 100 includes a plurality of channel termination devices 110-$x$ ($x$=0 to n-1) and a wavelength multiplexer/demultiplexer 120. Here, n is an integer greater than or equal to 2. The channel termination devices 110 are also called an OLT-CT (Channel Termination) or an OSU (Optical Subscriber Unit).

Different wavelengths are assigned to the channel termination devices 110-$x$. In other words, the channel termination devices 110-$x$ perform communication using optical signals that have different wavelengths. More specifically, the channel termination devices 110-$x$ each perform downlink communication using a downlink optical signal that has a wavelength $\lambda_{Dx}$, and perform uplink communication using an uplink optical signal that has a wavelength $\lambda_{Ux}$. The wavelength $\lambda_{Dx}$ and the wavelength $\lambda_{Ux}$ are different wavelengths.

The wavelength multiplexer/demultiplexer 120 is connected to each of the channel termination devices 110-$x$. The wavelength multiplexer/demultiplexer 120 combines the wavelength $\lambda_{Dx}$ downlink optical signals output from the channel termination devices 110-$x$ to generate a downlink WDM signal, and outputs the downlink WDM signal to the trunk fiber 310. The downlink WDM signal is distributed to each of the ONUs 200-$i$.

The ONUs 200-$i$ each have a variable wavelength and are assigned to one of the channel termination devices 110-$x$ (wavelength $\lambda_{Dx}$, $\lambda_{Ux}$). The ONUs 200-$i$ each extract the downlink optical signal that has the corresponding assigned wavelength $\lambda_{Dx}$ from the downlink WDM signal. Also, the ONUs 200-$i$ each transmit an uplink optical signal that has the corresponding assigned wavelength $\lambda_{Ux}$. The wavelength multiplexer/demultiplexer 120 demultiplexes uplink optical signals having various wavelengths from the trunk fiber 310, and outputs the uplink optical signals having the wavelengths $\lambda_{Ux}$ to the channel termination devices 110-x. In this way, communication is performed between the channel termination devices 110-x and the ONUs 200-i.

Note that it is assumed that the connection distances between the wavelength multiplexer/demultiplexer 120 and each of the channel termination devices 110-x are substantially the same connection distance. Here, "substantially the same connection distance" means that the connection distances are the same, or that the variation in the connection distance is small enough to be ignored.

The channel termination device 110 includes a control unit 111. The control unit 111 performs registration processing (discovery) and registers one or more ONUs 200 that are to be communication partners. The control unit 111 includes a storage unit 113. The storage unit 113 stores the identifiers of the communication partner ONUs 200 in association with RTTs.

The control unit 111 also performs communication control processing for controlling communication with the ONUs 200. Specifically, the control unit 111 determines a transmission timing and a transmission amount for an uplink optical signal from each of the ONUS 200 based on the corresponding RTTs of the ONUs 200. The control unit 111 then generates transmission permission information (Grant) that includes an identifier, a transmission timing, and a transmission amount for each of the ONUS 200. The control unit 111 transmits the generated transmission permission information to each of the ONUS 200. The ONUS 200 each transmit an uplink optical signal in accordance with the transmission timing and the transmission amount indicated by the transmission permission information.

The control unit 111 further includes an abnormality detection unit 115. The abnormality detection unit 115 detects fiber disconnection in the normal path PN (main trunk fiber 300N). In other words, the abnormality detection unit 115 detects a disconnected ONU 200-j that cannot perform communication via the normal path PN.

For example, after the above-described transmission permission information is transmitted, the abnormality detection unit 115 monitors the reception status of uplink optical signals from the transmission partner ONUS 200. If an uplink optical signal is not received from an ONU 200 within a certain period of time after the transmission permission information is transmitted, the abnormality detection unit 115 determines that the corresponding ONU 200 has become a disconnected ONU 200-j.

As another example, the abnormality detection unit 115 may determine that fiber disconnection has occurred if uplink optical signals from multiple ONUs 200 are interrupted at substantially the same time (within a certain period of time) and a DyingGasp signal has not been received. As yet another example, the abnormality detection unit 115 may determine that fiber disconnection has occurred if uplink optical signals from multiple ONUs 200 farther than a certain distance (RTT) are interrupted at substantially the same time (within a certain period of time). As still another example, the abnormality detection unit 115 may detect fiber disconnection by performing a test using an OTDR (Optical Time Domain Reflectometer).

The functionality of each of the channel termination devices 110 (control units 111) is realized by an optical transceiver that transmits and receives optical signals, a controller that controls the optical transceiver and performs various types of information processing, and the like. Typically, the controller includes a processor and memory. The functionality of the channel termination device 110 is realized by the processor executing a communication control program stored in the memory. The communication program may be recorded on a computer-readable recording medium. The controller may be realized with use of hardware such as an ASIC (Application Specific Integrated Circuit), a PLD (Programmable Logic Device), or an FPGA (Field Programmable Gate Array).

3. Processing Examples

Hereinafter, examples of processing performed by the optical communication system 10 shown in FIGS. 6 and 7 are described.

3-1. First Processing Example

Figure 8:
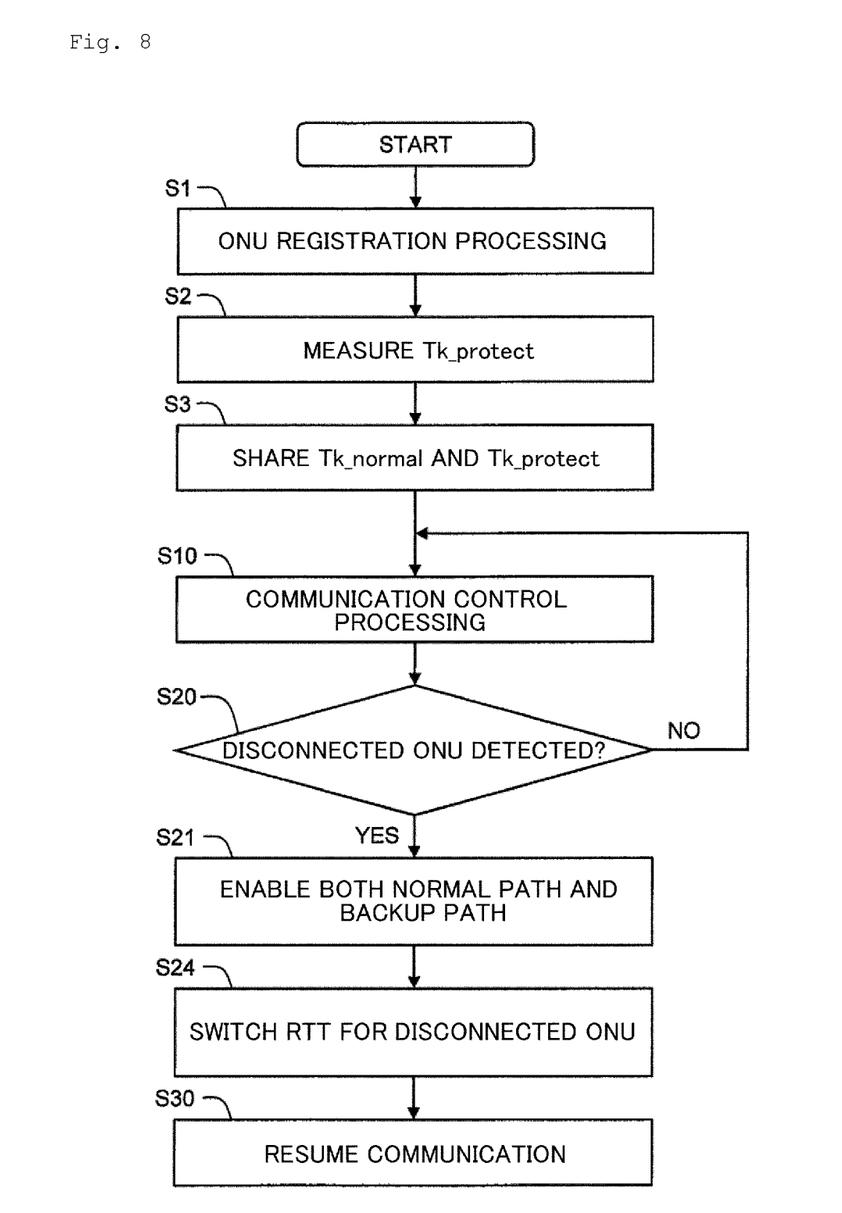
FIG. 8 is a flowchart showing a first processing example performed in the optical communication system according to the embodiment of the present invention.

FIG. 8 is a flowchart showing a first processing example.

In step S1, the OLT 100 enables the normal path PN and disables the backup path PS by operating the optical switch 430. Each channel termination device 110-x registers one or more ONUS 200 that are communication partners. At this time, the channel termination device 110-x measures the normal path RTT for each ONU 200 and assigns an identifier to each ONU 200. The normal path RTTs and the identifiers of the ONUS 200 are stored in the storage unit 113. In other words, each channel termination device 110-x holds the normal path RTTs and identifiers of the registered ONUS 200 in the storage unit 113.

In step S2, the OLT 100 disables the normal path PN and enables the backup path PS by operating the optical switch 430. One channel termination device 110-r selects one reference ONU 200-k from among the ONUS 200 that were registered in step S1. That channel termination device 110-r then uses the backup path PS to measure the first backup path RTT (Tk_protect) for the reference ONU 200-k. The channel termination device 110-r holds the acquired first backup path RTT in the storage unit 113. The OLT 100 then enables the normal path PN and disables the backup path PS by operating the optical switch 430.

In step S3, the channel termination device 110-r notifies another channel termination device 110-s (s≠r) of the first normal path RTT (Tk_normal) and the first backup path RTT (Tk_protect) for the reference ONU 200-k. The other channel termination device 110-s holds the first normal path RTT and the first backup path RTT that were notified in the storage unit 113. In this way, the first normal path RTT and the first backup path RTT for the reference ONU 200-k are shared by all of the channel termination devices 110-x (x=0 to n-1).

Preparation for normal operation is thus complete. Thereafter, main signal communication starts.

In step S10, the channel termination devices 110-x each perform communication with the registered ONUS 200 via the normal path PN. At this time, the channel termination device 110-x executes communication control processing for the ONUS 20 based on the held normal path RTTs. Note that the channel termination devices 110-x may periodically measure and update the normal path RTTs.

In step S20, the channel termination devices 110-x (abnormality detection units 115) determine whether or not fiber disconnection has occurred in the normal path PN. In other words, the channel termination devices 110-x determine whether or not a disconnected ONU 200-j has appeared. If a disconnected ONU 200-j does not exist (No in step S20), the processing returns to step S10. On the other hand, if at least one disconnected ONU 200-j is detected (Yes in step S20), the processing proceeds to step S21. Note that even after a disconnected ONU 200-j is detected, the corresponding channel termination device 110-x holds the registration information (identifier and second normal path RTT) for the disconnected ONU 200-j instead of deleting it.

In step S21, the OLT 100 enables the backup path PS in addition to the normal path PN by operating the optical switch 430.

In step S24, the channel termination device 110-z that is performing communication with the disconnected ONU 200-j switches the RTT for the disconnected ONU 200-j. Specifically, the channel termination device 110-z calculates the second backup path RTT (Tj_protect) based on the first normal path RTT (Tk_normal), the first backup path RTT (Tk_protect), and the second normal path RTT (Tj_normal) that are held. For example, the channel termination device 110-z calculates the second backup path RTT (Tj_protect) using Expression 1 shown above. The channel termination device 110-z then switches the RTT for the disconnected ONU 200-j from the second normal path RTT (Tj_normal) to the second backup path RTT (Tj_protect). Note that given that the identifier of the disconnected ONU 200-j does not change, the identifier does not need to be updated.

Note that the order of steps S21 and S24 may be reversed.

In step S30, the channel termination device 110-z resumes communication by performing communication with the disconnected ONU 200-j via the backup path PS. More specifically, the channel termination device 110-z resumes communication control processing for the disconnected ONU 200-j based on the second backup path RTT that was calculated in step S24.

Note that if the branch fibers 320-i (see FIG. 6) have different lengths, error may arise in the second backup path RTT calculated using Expression 1 shown above. In this case, the channel termination device 110-z may set a slightly longer Grant period for the disconnected ONU 200-j.

After communication is resumed, the channel termination device 110-z may periodically measure and update the second backup path RTT. Accordingly, the accuracy of the second backup path RTT is further improved.

3-2. Second Processing Example

Figure 9:
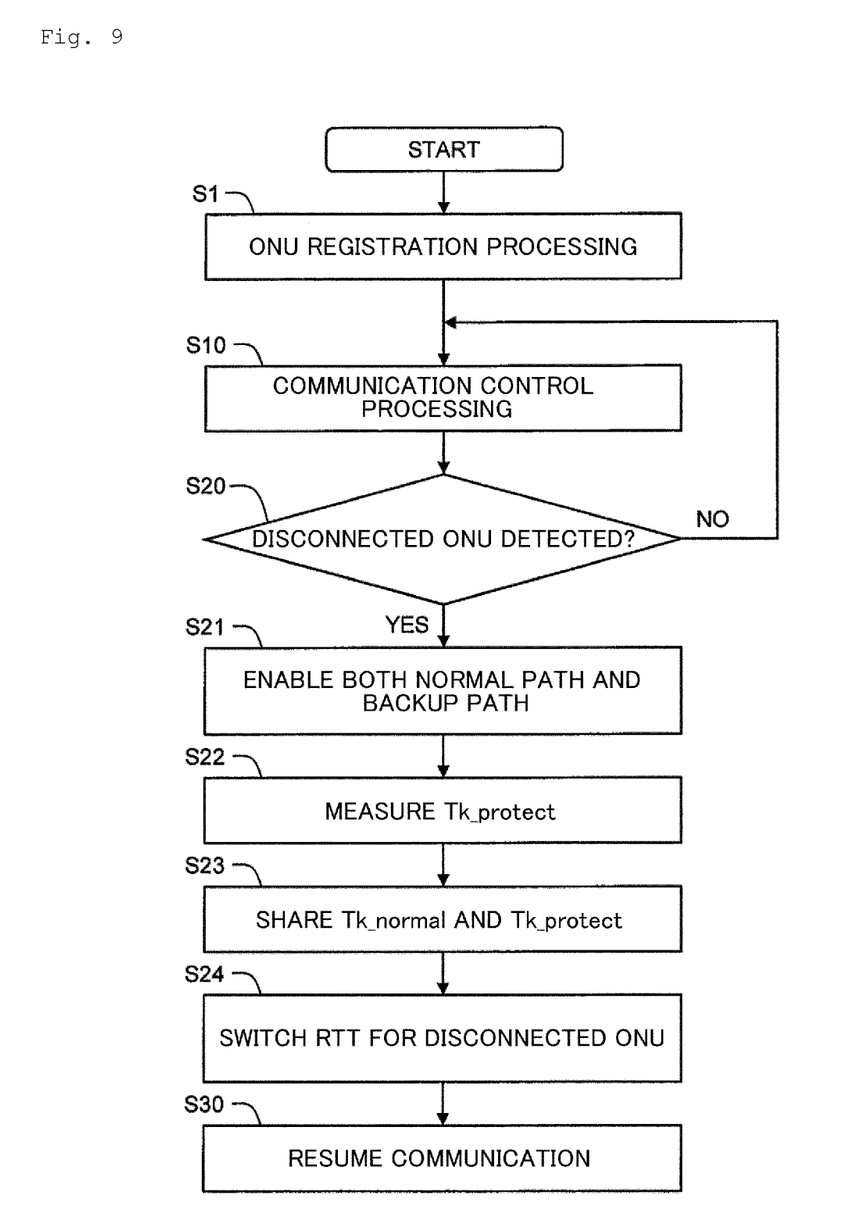
FIG. 9 is a flowchart showing a second processing example performed by the optical communication system according to the embodiment of the present invention.

FIG. 9 is a flowchart showing a second processing example. Redundant descriptions will not be given for portions that are the same as in the first processing example described above.

After step S1, main signal communication starts without executing steps S2 and S3. Steps S10 and S20 are the same as in the case of the first processing example. If at least one disconnected ONU 200-j is detected (Yes in step S20), the processing proceeds to step S21. The backup path PS is enabled in step S21, and then the processing proceeds to step S22.

In step S22, one channel termination device 110-r that was performing communication with the one or more disconnected ONUS 200-j selects one reference ONU 200-k from among the one or more disconnected ONUS 200-j. That channel termination device 110-r then uses the backup path PS to measure the first backup path RTT (Tk_protect) for the reference ONU 200-k. The channel termination device 110-r holds the acquired first backup path RTT in the storage unit 113.

In step S23, the channel termination device 110-r notifies another channel termination device 110-s (s≠r) of the first normal path RTT (Tk_normal) and the first backup path RTT (Tk_protect) for the reference ONU 200-k. The other channel termination device 110-s holds the first normal path RTT and the first backup path RTT that were notified in the storage unit 113. In this way, the first normal path RTT and the first backup path RTT for the reference ONU 200-k are shared by all of the channel termination devices 110-x (x=0 to n-1).

The subsequent steps S24 and S30 are the same as in the case of the first processing example.

According to the second processing example, the setting of the optical switch 430 is switched fewer times than in the first processing example.

4. Other Remarks

The optical communication system 10 according to the present embodiment is not limited to being a PON system. The technique according to the present embodiment can be applied to any optical communication system that has a loop path 300 and executes communication control processing based on RTT.

The optical communication system 10 according to the present embodiment is applicable to, for example, a mobile fronthaul (MFH) in the case where a mobile communication area is deployed linearly or in a plane.

REFERENCE SIGNS LIST

10 Optical communication system
100 OLT (master station device)
110 Channel termination device
111 Control unit
113 Storage unit
115 Abnormality detection unit
120 Wavelength multiplexer/demultiplexer
200 ONU (slave station device)
200-j Disconnected ONU
200-k Reference ONU
300 Loop path
300N Main trunk fiber
300S Backup trunk fiber
310 Trunk fiber
320 Branch fiber
410 Optical branching/coupling unit
420 Optical branching/coupling unit
430 Optical switch
PN Normal path
PS Backup path

The invention claimed is:

1. An optical communication system comprising:
a plurality of slave station devices that are connected to a loop path in parallel; and
a master station device that is connected to the loop path and configured to perform communication with each of the slave station devices,
wherein communication paths between the master station device and each of the slave station devices include:
a normal path that extends along the loop path from the master station device to each of the slave station devices in a first direction, and
a backup path that extends along the loop path from the master station device to each of the slave station devices in a second direction that is opposite to the first direction,
the master station device is configured to execute communication control processing for controlling communication with each of the slave station devices based on an RTT (Round Trip Time) between the master station device and the slave station device, a normal path RTT is the RTT in a case of communication performed via the normal path, a backup path RTT is the RTT in a case of communication performed via the backup path, a first slave station device is one of the slave station devices, a first normal path RTT is the normal path RTT between the master station device and the first slave station device, a first backup path RTT is the backup path RTT between the master station device and the first slave station device, a second slave station device is a slave station device that cannot perform communication via the normal path, among the plurality of slave station devices, a second normal path RTT is the normal path RTT between the master station device and the second slave station device, a second backup path RTT is the backup path RTT between the master station device and the second slave station device, the master station device holds the normal path RTT for each of the slave station devices and the first backup path RTT, if the second slave station device does not exist, the master station device executes the communication control processing with respect to the slave station devices based on the normal path RTTs, and if the second slave station device is detected, the master station device calculates the second backup path RTT based on the first normal path RTT, the first backup path RTT, and the second normal path RTT, and resumes the communication control processing with respect to the second slave station device based on the calculated second backup path RTT.

2. The optical communication system according to claim 1, wherein letting the first normal path RTT, the first backup path RTT, and the second normal path RTT respectively be expressed as Tk_normal, Tk_protect, and Tj_normal, the master station device calculates Tk_normal+Tk_protect−Tj_normal as the second backup path RTT.

3. The optical communication system according to claim 1, wherein before communication is started with the slave station devices via the normal path, the master station device selects the first slave station device from among the slave station devices, preliminarily measures the first backup path RTT, and holds the measured first backup path RTT.

4. The optical communication system according to claim 1, wherein after at least one second slave station device is detected, the master station device selects the first slave station device from among the one or more second slave station devices, measures the first backup path RTT, and holds the measured first backup path RTT.

5. The optical communication system according to claim 1, wherein if the second slave station device does not exist, the master station device enables the normal path and disables the backup path, and if the second slave station device is detected, the master station device enables both the normal path and the backup path.

6. A master station device that performs communication with each of a plurality of slave station devices in an optical communication system, wherein the slave station devices are connected to a loop path in parallel, communication paths between the master station device and each of the slave station devices include:

a normal path that extends along the loop path from the master station device to each of the slave station devices in a first direction, and a backup path that extends along the loop path from the master station device to each of the slave station devices in a second direction that is opposite to the first direction, the master station device is configured to execute communication control processing for controlling communication with each of the slave station devices based on a RTT (Round Trip Time) between the master station device and the slave station device, a normal path RTT is the RTT in a case of communication performed via the normal path, a backup path RTT is the RTT in a case of communication performed via the backup path, a first slave station device is one of the slave station devices, a first normal path RTT is the normal path RTT between the master station device and the first slave station device, a first backup path RTT is the backup path RTT between the master station device and the first slave station device, a second slave station device is a slave station device that cannot perform communication via the normal path, among the plurality of slave station devices, a second normal path RTT is the normal path RTT between the master station device and the second slave station device, a second backup path RTT is the backup path RTT between the master station device and the second slave station device, the master station device holds the normal path RTT for each of the slave station devices and the first backup path RTT, if the second slave station device does not exist, the master station device executes the communication control processing with respect to the slave station devices based on the normal path RTTs, and if the second slave station device is detected, the master station device calculates the second backup path RTT based on the first normal path RTT, the first backup path RTT, and the second normal path RTT, and resumes the communication control processing with respect to the second slave station device based on the calculated second backup path RTT.

* * * * *